(12) United States Patent
Miller et al.

(10) Patent No.: US 7,669,446 B2
(45) Date of Patent: Mar. 2, 2010

(54) INDEXER FOR USE WITH A SHEET BENDING BRAKE

(75) Inventors: Ammon B. Miller, Troupsburg, NY (US); Daniel B. Miller, North Bingham, PA (US)

(73) Assignee: Edmund Burke, Inc., Adamsville, PA (US)

( * ) Notice: Subject to any disclaimer, the term of this patent is extended or adjusted under 35 U.S.C. 154(b) by 343 days.

(21) Appl. No.: 11/470,364

(22) Filed: Sep. 6, 2006

(65) Prior Publication Data

US 2008/0053180 A1    Mar. 6, 2008

(51) Int. Cl.
*B21C 51/00* (2006.01)
*B21D 11/20* (2006.01)

(52) U.S. Cl. .................... 72/31.12; 72/319; 72/420

(58) Field of Classification Search ........... 72/31.12, 72/319–321, 420, 461, 31.1, 428; 83/435.15–435.19; 271/264, 269, 271; 414/749.1
See application file for complete search history.

(56) References Cited

U.S. PATENT DOCUMENTS

| | | | |
|---|---|---|---|
| 2,875,808 A | 3/1959 | Nelson | |
| 2,986,393 A * | 5/1961 | Brigham | 271/240 |
| 3,191,412 A | 6/1965 | Duvall | |
| 3,592,033 A * | 7/1971 | Murdoch | 72/21.3 |
| 3,702,502 A | 11/1972 | Kelleher | |
| 3,815,393 A * | 6/1974 | Daniels | 72/6.1 |
| 3,826,119 A * | 7/1974 | Marotto | 72/7.2 |
| 4,055,070 A | 10/1977 | Wingate et al. | |
| 4,577,538 A | 3/1986 | Hirata et al. | |
| 5,758,558 A * | 6/1998 | Squires | 83/522.18 |
| 5,761,939 A * | 6/1998 | Spencer et al. | 72/31.1 |
| 5,983,688 A | 11/1999 | Anzai et al. | |
| 6,082,164 A | 7/2000 | Palmer | |
| 6,748,783 B1 | 6/2004 | Chubb et al. | |
| 6,763,695 B1 | 7/2004 | Chubb et al. | |
| 7,021,096 B2 * | 4/2006 | Barnett | 72/31.1 |
| 2002/0056306 A1 | 5/2002 | Cleave et al. | |
| 2005/0086991 A1 | 4/2005 | Barnett | |

* cited by examiner

*Primary Examiner*—Dana Ross
*Assistant Examiner*—Debra M Sullivan
(74) *Attorney, Agent, or Firm*—Alicia M. Passerin, Esq.; Cohen & Grigsby, P.C.

(57) ABSTRACT

An indexer is used on or in combination with a sheet bending brake to cut or bend a piece of sheet metal at a predetermined location without having to make pre-measurements and marks. The indexer comprises a scale and a rotable shaft having a handle. A first bending arm with a gauge and opposed second and third bending arms are connected to the shaft. Second and third arms each have a stop that positions the sheet metal to make a cut or bend at the predetermined location. An example of a method of using the indexer is also discussed.

19 Claims, 6 Drawing Sheets

INDEXER FOR USE WITH A SHEET BENDING BRAKE

FIELD OF THE INVENTION

The invention relates to a sheet bending brake, and particularly to an indexer for positioning a piece of sheet metal in a sheet bending brake to bend and/or cut a piece of sheet metal at a predetermined location without having to measure or mark the sheet metal.

BACKGROUND OF THE PRIOR ART

Conventional sheet metal brakes require an operator of the device to use a writing instrument and a hand-held ruler or the like to make marks along the length of a piece of sheet metal to indicate where cuts and/or bends should be made to the piece of sheet metal when forming the sheet metal into building trims. Many trim pieces require that multiple cuts and/or bends be made to the piece of sheet metal in order to achieve the final product. In such situations the operator frequently has to mark a first side of the piece of sheet metal for one bend or cut and then flip the sheet metal from face-up to face-down or vice versa to mark and bend or cut the second side.

Not only is this a time-consuming process, but any incorrect measurements lead to incorrect cuts and/or bends and thus increase the production of scrap or waste materials. Furthermore, operators of conventional sheet metal brakes must be trained on how to position the sheet metal in the brake for a given cut or bend, such as whether to position the sheet metal face-up or face-down. Another problem associated with conventional sheet metal brakes is that operation is generally easier with two operators rather than a single operator, because holding the sheet metal for accurate measurements and flipping the sheet metal for additional cuts or bends is difficult and cumbersome, particularly for a sole operator. Furthermore, a novice cannot use conventional sheet bending brakes without some training as to how to measure and cut or bend sheet metal. Finally, an understanding of how to position a piece of sheet metal in the brake to make a given cut or bend requires training or experience.

Thus there is a need for a device that can be used with conventional sheet bending brakes that requires minimal training and that increases productivity and efficiency. Several devices in the prior art have attempted to address this need but these prior art devices are heavy, expensive, and stationary, and often rely on electrical power for operation. The present invention meets this need by providing an indexer that is lightweight, portable, and cost- and energy-efficient.

SUMMARY AND OBJECTS OF THE INVENTION

Accordingly, in an example it is an object of the present invention to provide an indexer for use with a sheet bending brake that eliminates the need for measuring and marking each cut or bend on the piece of sheet metal.

It is a further object in an embodiment of the invention to provide an indexer that increases efficiency and substantially eliminates erroneous cuts or bends to pieces of sheet metal.

It is a further object in an embodiment of the invention to provide an indexer that cuts or bends a piece of sheet metal with a minimal number of motions.

It is a further object in an embodiment of the invention to provide an indexer for use with a sheet bending brake that can be used with minimal training or experience.

It is yet another object in an embodiment of the invention to provide an indexer for use with a sheet bending brake that can be used by a sole operator.

It is still a further object in an embodiment of the invention to provide an indexer that is lightweight, portable, and cost- and energy-efficient.

It is a further object in an embodiment of the invention to provide an indexer that can be positioned and operated in such a way as to increase productivity.

It is yet another object in an embodiment of the invention to provide an indexer that can be operated without being powered by electricity.

The claimed invention meets these needs by providing an indexer for use with a sheet bending brake. The claimed indexer moves the sheet metal to a position within the brake where the cut or bend is to be made. Minimal training is required to correctly cut or bend a piece of sheet metal because when the operator moves the gauge to a reference point, the piece of sheet metal is automatically moved to the correct position within the brake.

The indexer comprises a rotatable shaft having at least two moveable arms attached thereto. The shaft is rotatable to cause the first arm to move to a first position that is a reference point, such as for example on a scale or template. The second arm is moved to a position that corresponds to the first position. The position of the second arm determines the position of the piece of sheet metal in the brake. In an example, there is a gauge or pointer attached to the first arm. In an example of a preferred embodiment, there are second and third movable arms attached to opposed ends of the shaft. Rotation of the shaft also moves the third arm to a position that corresponds to the first position and the position of the third arm also determines the position of the piece of sheet metal in the brake. In an example, a slidable guide comprising a stop is operably connected to a second end of each second member of second and third arms that positions the piece of sheet metal in the brake so that the cut and/or bend is made at the desired or pre-determined location.

When the handle of the indexer is moved, the shaft rotates and the first arm moves such that the pointer can be adjusted to a reference point on the scale, which is based upon where the predetermined cut or bend is to be made on the sheet metal. Movement of the handle and the resulting rotation of the shaft also moves second and third arms to a corresponding position so that the sheet metal is positioned or oriented within the brake such that the cut or bend is made at an appropriate place.

In an alternate embodiment, the claimed invention is an indexer as described above in combination with a sheet metal brake.

Another embodiment is a method of using the indexer described above with a sheet bending brake.

Other objects, features, aspects and advantages of the present invention will become better understood or apparent from the following detailed description, drawings, and appended claims of the invention.

DESCRIPTION OF THE PREFERRED EMBODIMENT

Figure 1:
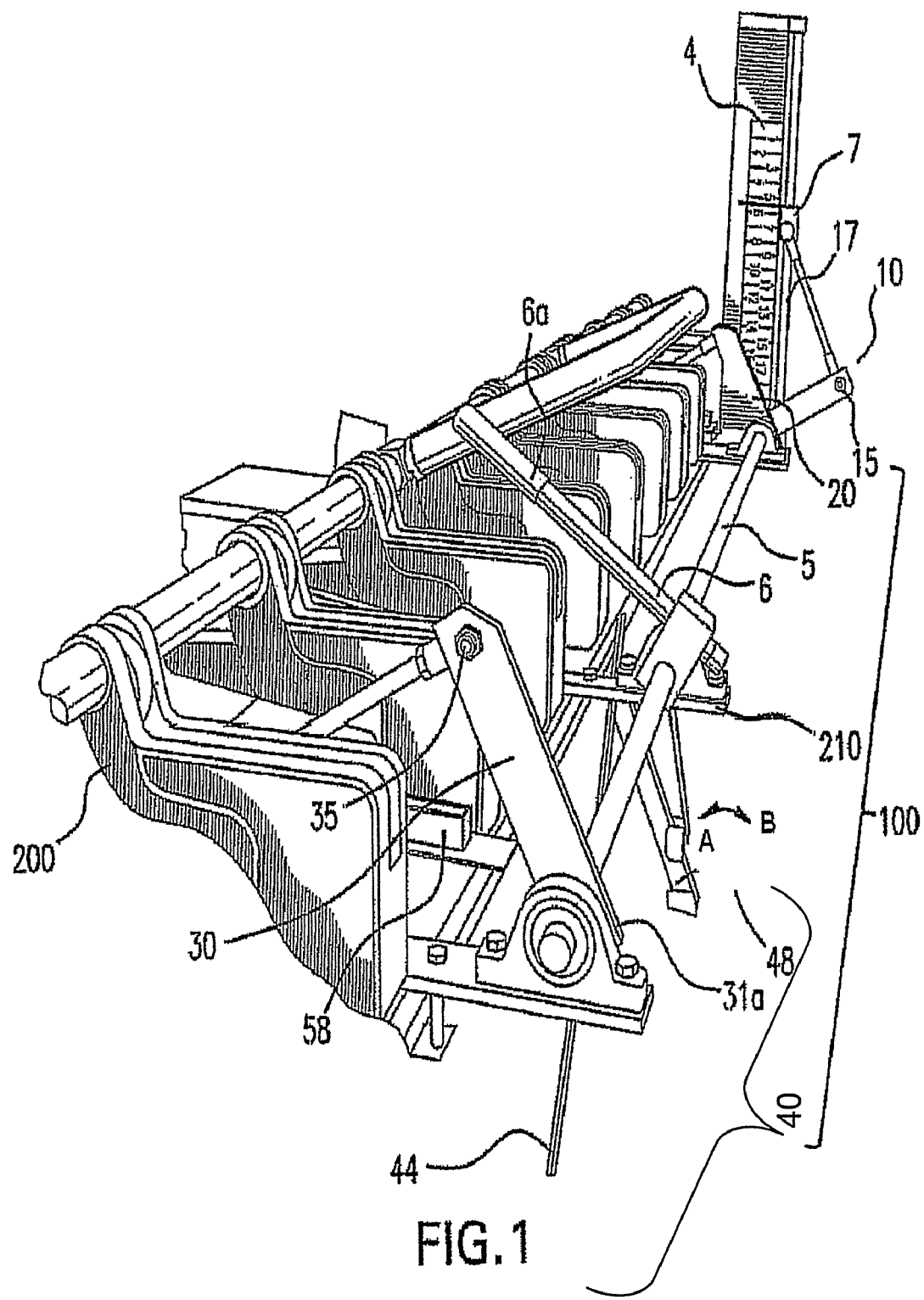
FIG. 1 is a perspective view of an example of the claimed indexer in combination with a sheet bending brake.

The claimed indexer 100 comprises at least one scale 4 and a rotatable shaft 5 having a handle 6 and moveable bending arms 10 20, 30 attached thereto. Preferably, there are first 10, second 20, and third 30 bending arms, as shown in the figures and specifically in FIG. 1. Each arm 10, 20, 30 is comprised of first 11, 21, 31 and second 12, 22, 32 members pivotally connected at second 11b, 21b, 31b and first 12a, 22a, 32a ends, respectively. The first end 11a, 21a, 31a of first member 11, 21, 31 is connected to the shaft 5. There is an adjustable gauge 7 that is operable by the handle 6 and pivotally connected to the first arm 10. A slidable guide 8 is operably connected to a second end 22b, 32b of second member 22, 32 of each of the second and third arms 20, 30. In examples, the indexer 100 is made from metal such as aluminum, brass, bronze, or the like. Preferably, the material from which indexer 100 is made is a light-weight material to facilitate transportation.

Figure 2:
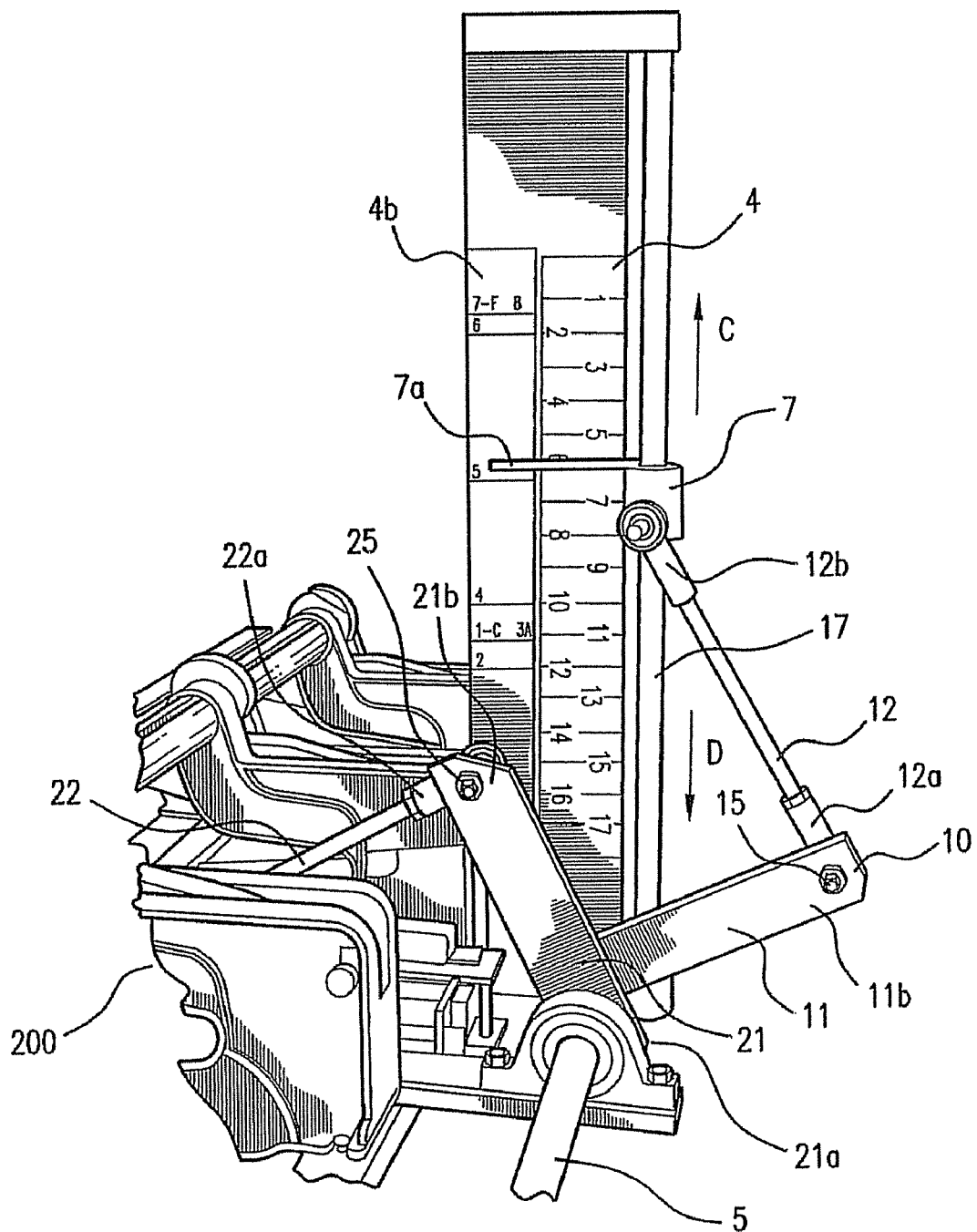
FIG. 2 shows an example of the scale comprising the claimed indexer.
Figure 4:
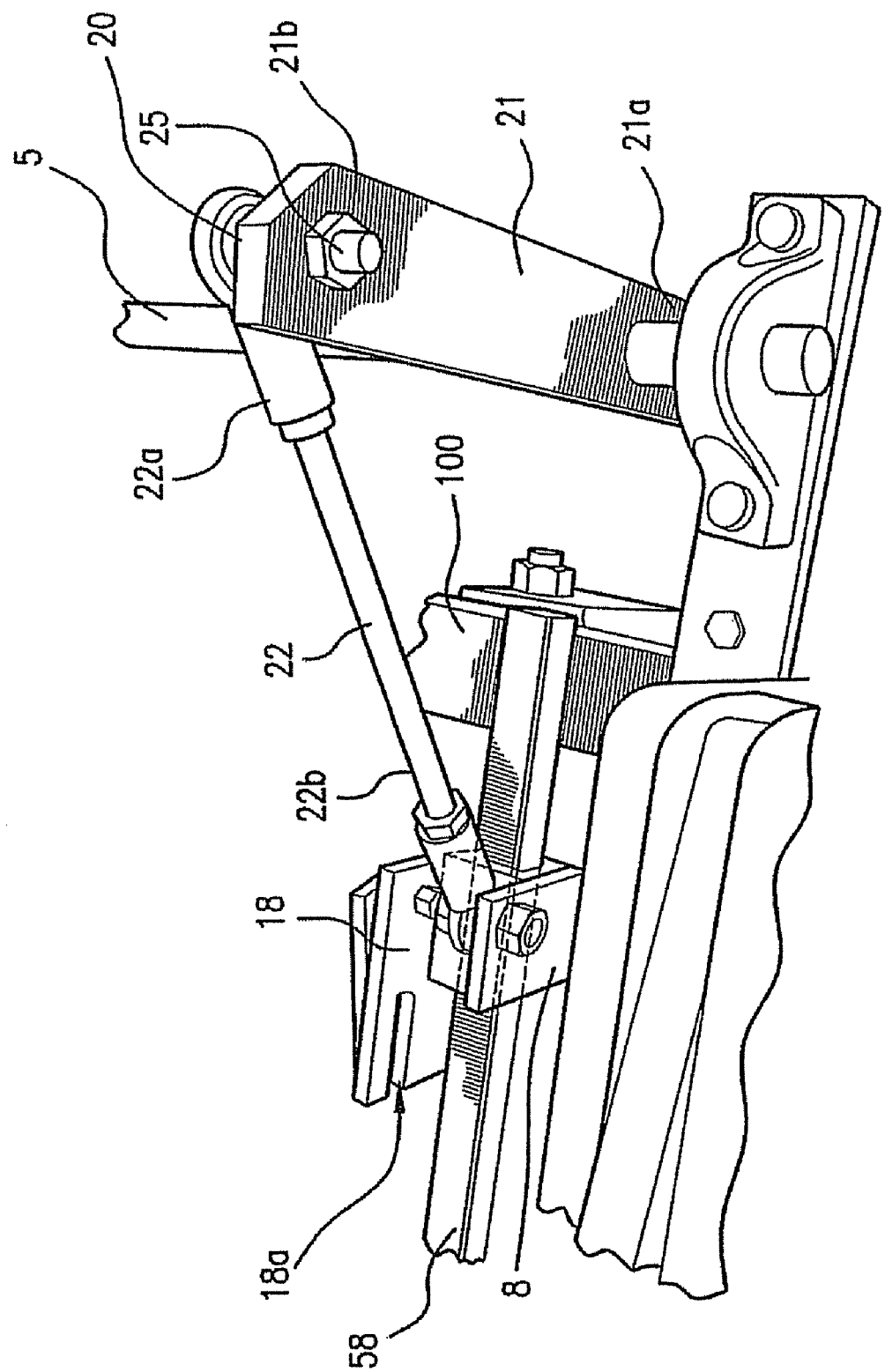
FIG. 4 is a perspective view of a portion of the indexer shown in FIG. 1.

Slideable guide 8 comprises a stop 18 that positions the piece of sheet metal (not shown) on brake 200 and positions and holds a predetermined desired location based on a reference point. See FIG. 4. An example of the scale 4 comprising the claimed indexer 100 is shown in FIG. 2. In the example shown, the scale 4 is a conventional ruler for measuring distance having either metric or English units of measurement. Scale 4 may be either unitary with indexer 100 or may be mounted on or attached to indexer 100, such as by screws or bolts. In an example, scale 4 is magnetized such that scale 4 is attached to indexer by magnetic attraction to the metal indexer 100. Scale 4 is positioned such that it is cooperable with gauge 7 (described below). Preferably, scale 4 is positioned such that it is easily viewed and accessed by an operator of brake 200. In another example, scale 4 is at least one removable template 4b that mounts directly on indexer 100 and that preferably aligns with a zero point. In an example, removable template 4b magnetically mounts to indexer 100 so that templates 4b can be easily interchanged during operation. Preferably each removable template 4b is customized to position the piece of sheet metal in the brake so that a cut or bend is made in the piece of sheet metal to produce a desired specific end-product. Each template 4b may be for either customized cuts or bends, or may be for cuts or bends that are standard within a given industry. In an example, templates 4b may made to correspond to a particular manufacturer's style of trim. For example, each customized template 4b may outline each of a plurality of steps required to create a standard piece of trim having standard cuts and/or bends. The outline on each template 4b may include a reference point for positioning of gauge 7, a plurality of numbered or ordered steps for proceeding with the cutting and/or bending, how to position the sheet metal within the brake such as if the sheet metal is positioned face-up or face-down for a given cut or bend, and/or the angle at which the cut or bend is to be made. In a preferred example such as the one shown in FIG. 2, the scale 4 comprises both a conventional ruler 4a and at least one removable template 4b. In such an example, reference point on each template is aligned with a zero-point on ruler.

The indexer 100 further comprises an adjustable gauge 7 operable by handle 6 and pivotally connected to first arm 10. In the example shown in FIG. 2, gauge 7 is connected to second end 12b of second member 12 of first arm 10 and slidably engages a slide rod 17 as first arm 10 extends and retracts. Gauge 7 may comprise a pointer 7a or the like that is capable of being positioned at a reference point on scale 4. In examples, reference point is determined by the desired or predetermined location of a cut or a bend on sheet metal.

As shown in the example in FIG. 1, the indexer 100 further comprises a rotatable shaft 5 having a handle 6 and moveable first, second, and third bending arms 10, 20, 30 attached thereto. Handle 6 operates rotation of shaft 5, and the direction of rotation of shaft 5 determines extension or retraction of moveable bending arms 10, 20, 30. First moveable bending arm 10 is comprised of first and second members 11, 12 that are pivotally connected at their second 11b and first 12a ends, respectively, thereby enabling first 10 arm to pivot about pivot point 15 to retract or extend as shaft 5 is moved in direction A-B. First end 11a of first member 11 is pivotally attached to shaft 5. First moveable arm 10 extends along scale 4 as shaft 5 rotates in direction A and retracts along scale as shaft rotates in direction B. Second end 12b of second member 12 is connected to gauge 7 so that as handle 6 rotates shaft 5 and first arm 10 extends or retracts, gauge 7 is moved along scale 4 and can be positioned at a reference point. The reference point is determined by the predetermined position of the cut or bend to be made for a given trim piece. In the example shown in FIG. 2, gauge 7 slidably engages a slide rod 17 positioned parallel to scale 4, but gauge 7 is not limited as such and may operate in any manner known to those skilled in the art.

Second and third arms 20, 30 are at opposed ends of the shaft 5 and in an example are parallel to and coplanar with each other. Preferably, first, second, and third arms 10, 20, 30 move in response to angular rotation of shaft 5, with the movement of the first arm 10 defining a plane that is substantially orthogonal to a plane defined by the movement of second and third arms 20, 30 as shown generally in the figures. When the shaft 5 is rotated, first arm 10 is moved to a first position and second and third arms 20, 30 are moved to a position that corresponds thereto, the position of second and third arms 20, 30 determining a position of the piece of sheet metal that is in the indexer.

Second and third moveable bending arms 20, 30 are each comprised of first 21, 31 and second 22, 32 members that are pivotally connected at their second 21b, 31b and first 22a, 32a ends, respectively, thereby enabling second and third arms 20, 30 to pivot about pivot point 25, 35 to retract or extend as shaft 5 is moved in direction A-B. First end 21a, 31a of first member 21, 31 of each of second and third arms 20, 30 are each pivotally attached to shaft 5. Second and third arms 20, 30 extend as shaft 5 rotates in direction A and retract as shaft 5 rotates in direction B. Second and third arms 20, 30 extend and retract in substantial unison as shaft 5 is rotated. Second end 22b, 32b of each second member 22, 32 is attached to a slidable guide 8 comprising a stop 18, described below. As handle 6 is moved in second direction B to rotate shaft 5, first and second members 21, 22, 31, 32 pivot about pivot points 25, 35 to retract second and third arms 20, 30. In this way, first, second, and third arms 10, 20, 30 cooperate with handle 6 such that as handle 6 is moved to rotate shaft in direction A-B and to adjust gauge 7 to a point on scale 4 by moving first arm 10 in a direction C-D, rotation of shaft 5 also extends or retracts second and third arms 20, 30 respectively.

Figure 3:
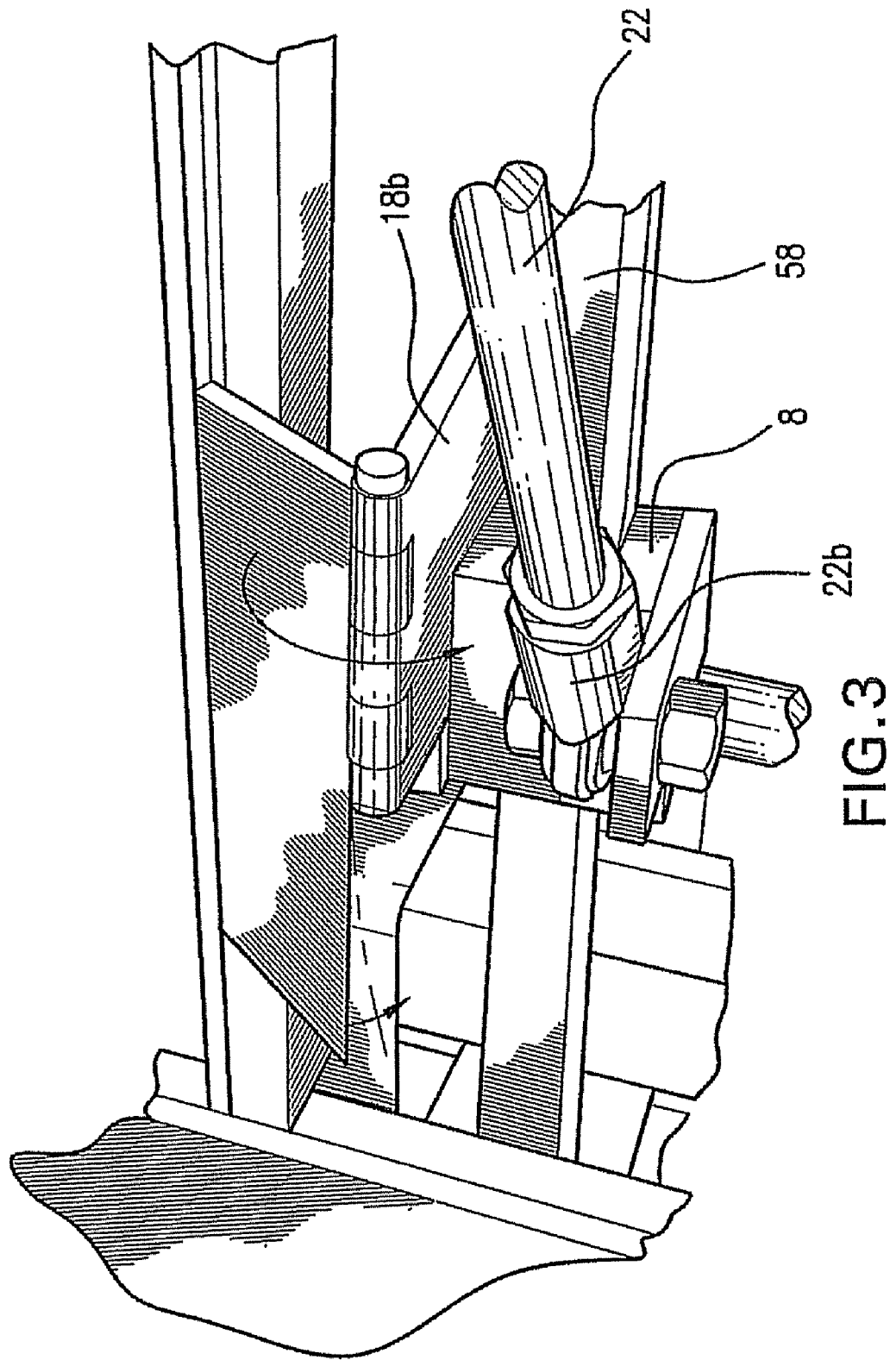
FIG. 3 is a top perspective view of a portion of the indexer shown in FIG. 1.
Figure 5:
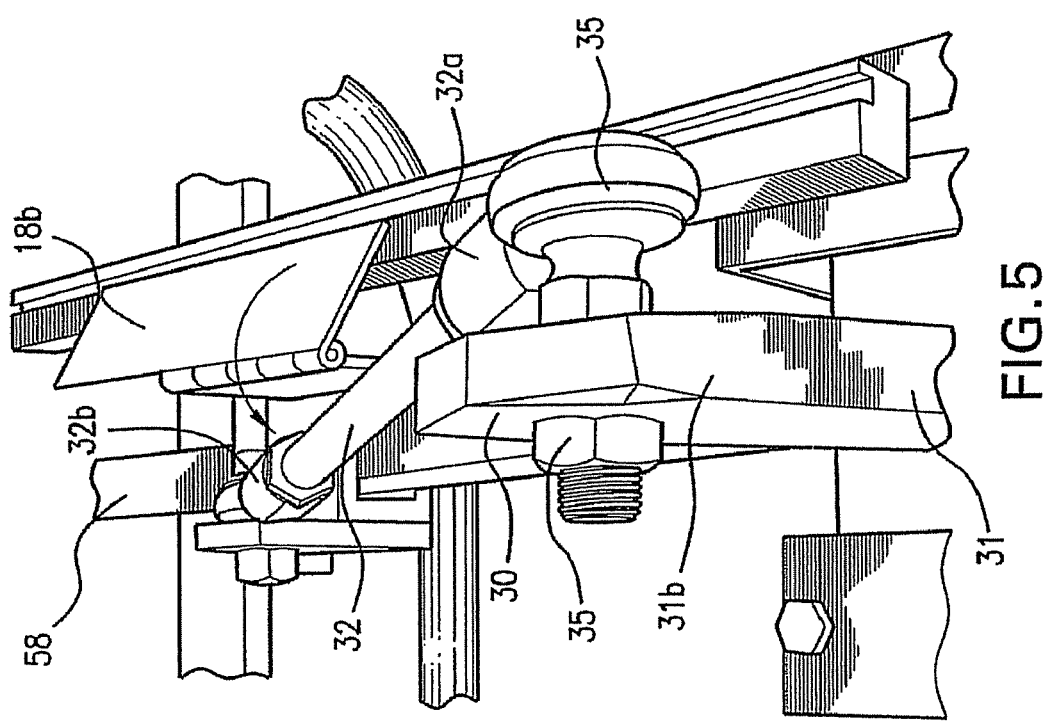
FIG. 5 is a rear perspective view of a portion of the indexer shown in FIG. 1.

As shown in FIG. 1, second end 22b, 32b of each second member 22, 32 is attached to a slidable guide 8 that includes a stop 18. Each slidable guide 8 slidably engages a slide bar 58 mounted to indexer 100, such as by bolts and the like. Slide bars 58 are parallel to and coplanar with each other. Stop 18 positions and holds the piece of sheet metal in the brake at a desired location for at least one cut and/or bend on a piece of sheet metal. As second and third arms 20, 30 extend and retract, slidable guide 8 slidably engages slide bar 58 and positions stop 18 so that sheet metal is positioned within sheet bending brake 200 to make appropriate cuts or bends depending on the end-product desired. In this way, the operator rotates the shaft 5 by operation of the handle 6 to bring the slidable guides 8 and stops 18 to the proper position for the particular bend or cut that the brake 200 is to perform. Stop 18 may be made from a polished or hardened material and may optionally have a precision ball glide or a bearing surface. In an example, stop 18 is a stop groove 18a, such as the one shown in FIG. 4, that receives an edge of the sheet metal that is to be bent or cut. In a preferred example, stop 18 is a spring-tempered stop 18b such as the one shown in FIGS. 3 and 5. Spring-tempered stop 18b abuts an edge of the sheet metal that is to be bent or cut. Spring-tempered stop 18b has a spring that allows it to collapse when brake 200 is closed and then return to an angle, preferably of about 35° to about 55°, when brake 200 is open. The advantage of the spring-tempered stop 18b is that its spring motion enables the stop 18 to give when the sheet metal is bent or cut, thereby holding the sheet metal in place and preventing the stop from interfering with the operation of the sheet bending brake 200. In an example, there is a grooved slide (not shown) for spring-tempered stop 18b to ride in.

Rotatable shaft 5 is operated by movement of handle 6. There is preferably a hand grip 6c on one end of handle 6a and the opposite end of handle 6 is attached to shaft 5. In an example, handle 6 further comprises a movement limiting device (not shown) to limit the movement of stop 18 and shaft 5 when a piece of sheet metal is inserted into brake 200. Preferably, movement limiting device clamps on to shaft 5. In an example, movement limiting device is a tension adjuster that prevents slippage and controls rotation of shaft. Movement limiting device is preferably positioned on handle 6b substantially near shaft 5.

In a preferred example, at least one support 40 is attached to brake 200, as shown in FIG. 1. In an example, the support 40 comprises at least two legs 44 and a brace 48. In an example, support 40 is removable and is attached to brake 200 by clamps, screws, bolts, or the like. In another example, there is a support 40 attached to indexer 100. Support may be removable or unitary with indexer 100.

In an example, indexer 100 is attached to brake 200 by connector pieces 210 by clamps, screws, bolts, or the like.

The claimed indexer 100 may be used in conjunction with any portable sheet metal brake 200. In an example, a conventional brake 200 may be retrofitted for use with the claimed indexer 100 by clamping or bolting indexer to brake, such as the example shown in FIG. 1. Preferably, indexer 100 is clamped or bolted to a first rail 220 on brake.

In an example of an alternate embodiment, the indexer 100 is combined with a sheet metal brake 200. Shaft 5 is rotated to extend or retract first arm 10 in direction A-B to a predetermined point on scale 4. Rotation of shaft 5 also causes second and third arms 20, 30 to extend or retract in direction C-D to position the piece of sheet metal (not shown) in brake 200 to correctly and accurately make a cut or bend in the piece of sheet metal to yield a final desired end-product. Preferably, first arm 10 has a gauge 7 or the like on an end, as described above, that interfaces with scale 4. The position of second arm 20 is directly related to the position of first arm 10 relative to scale 4.

Figure 6:
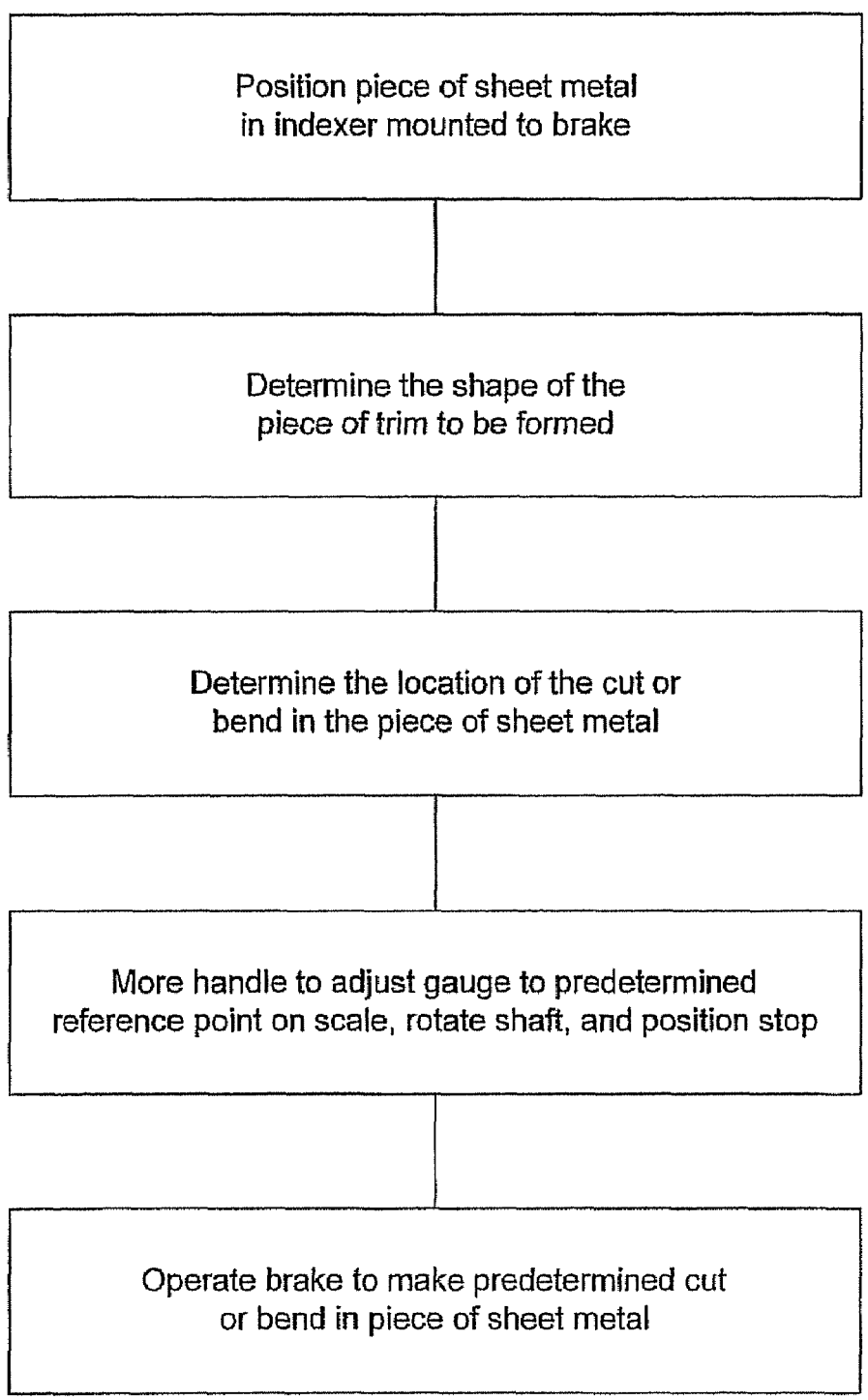
FIG. 6 is a flow diagram outlining the steps of the method of using the claimed indexer.

In yet another embodiment, the claimed invention is a method of using the indexer 100 in combination with a sheet metal brake 200. A flow diagram outlining the steps of the claimed method is shown in FIG. 6. In a first step, a piece of sheet metal to be bent or cut is positioned in the indexer 100 mounted to brake 200, and preferably is positioned either in stop groove 18a or abutting an edge of spring-tempered stop 18b. In a next step, the desired location of the cut or bend is determined, based on the end product or shape of piece of trim to be formed. Then, the operator operates the handle 6 to adjust or move gauge 7 to a reference point on scale 4, based on the predetermined cut or bend to be made. Adjustment or movement of handle 6 rotates shaft 5, which moves first arm 10 and consequently moves gauge 7. Rotation of shaft 5 by moving handle 6 also moves second and third arms 20, 30, thereby positioning stop 18. When gauge 7 is aligned with scale 4 at predetermined position, brake 200 is operated to make the predetermined cut or bend in the piece of sheet metal. These steps are optionally repeated more than once in order to perform the plurality of cuts and bends often required to produce a piece of trim. Finally, piece of sheet metal is removed from brake 200. The claimed steps are optionally repeated for a second piece of sheet metal. In an example, a template 4b may be attached to indexer 100 at any time prior to moving gauge 7.

While the foregoing has been set forth in considerable detail, it is to be understood that the drawings and detailed embodiments are presented for elucidation and not limitation. Design variations, especially in matters of shape, size, and arrangements of parts, may be made but are within the principles of the invention. Those skilled in the art will realize that such changes or modifications of the invention or combinations of elements, variations, equivalents, or improvements therein are still within the scope of the invention as defined in the appended claims.

We claim:

1. An indexer for use with a sheet bending brake, said indexer comprising:
   a rotatable shaft having at least two movable bending arms pivotally attached thereto, wherein each of said arms comprises first and second members, said first and second members each having first and second ends, respectively, with the first end of said first member being pivotally connected to said shaft and with the second end of said first member being pivotally joined to the first end of said second member,
   said shaft being rotatable to cause a first arm to pivot about a first pivot point to extend or retract to a first position and a second arm to pivot about a second pivot point to extend or retract to a position corresponding thereto,
   said first position being a reference point,
   wherein said position of said second arm determines a position of a piece of sheet metal.

2. An indexer as in claim 1 further comprising at least one scale support for attachment of a scale, said reference point being indicated on said scale.

3. An indexer as in claim 2 wherein said scale is a ruler, a template, or a combination thereof.

4. An indexer as in claim 1 further comprising:
   at least one slidable guide that engages a slide bar mounted on said brake and that is operably connected to said second arm to position said piece of sheet metal.

5. An indexer as in claim 4 wherein said at least one slidable guide is attached to the second end of said second member of said at least one second arm.

6. An indexer as in claim 1 further comprising: at least one support that supports and attaches to or is unitary with said indexer.

7. An indexer for use with a sheet bending brake, said indexer comprising:
a rotatable shaft having three movable bending arms pivotally attached thereto, wherein each of said arms comprises first and second members, said first and second members each having first and second ends, respectively, with the first end of said first member being pivotally connected to said shaft and with the second end of said first member being pivotally joined to the first end of said second member,
said shaft being rotatable to cause said a first arm to pivot about a first pivot point to extend or retract to a first position, a second arm to pivot about a second pivot point to extend or retract to a position corresponding to said first position, and a third arm to pivot about a third pivot point to extend or retract to a position corresponding to said first position,
said first position being a reference point,
wherein said position of said second arm determines a position of a piece of sheet metal, and
wherein said position of said third arm also determines said position of said piece of sheet metal.

8. An indexer as in claim 7 wherein said second and third arms are attached to opposed ends of said shaft.

9. An indexer as in claim 7 further comprising at least two slidable guides that engage a slide bar mounted on said brake, one of said guides operably connected to said second arm and the other said guide operably connected to said third arm to facilitate movement of said piece of sheet metal.

10. An indexer as in claim 9 wherein one of said slidable guides is attached to the second end of said second member of said second arm and the other of said slidable guides is attached to the second end of said second member of said third arm.

11. An indexer for use with a sheet bending brake, said indexer comprising:
a rotatable shaft having at least two movable bending arms pivotally attached thereto,
said shaft being rotatable to cause a first arm to pivot about a first pivot point to extend or retract to a first position and a second arm to pivot about a second pivot point to extend or retract to a position corresponding thereto,
said first position being a reference point,
wherein said position of said second arm determines a position of a piece of sheet metal, and
at least one stop that engages a slide bar mounted on said brake and that is operably connected to said second arm to position said piece of sheet metal.

12. An indexer as in claim 11 wherein said stop is a spring tempered stop.

13. An indexer as in claim 11 wherein said stop is a stop groove.

14. An indexer for use with a sheet bending brake, said indexer comprising:
a rotatable shaft having three movable bending arms pivotally attached thereto,
said shaft being rotatable to cause said a first arm to pivot about a first pivot point to extend or retract to a first position, a second arm to pivot about a second pivot point to extend or retract to a position corresponding to said first position, and a third arm to pivot about a third pivot point to extend or retract to a position corresponding to said first position,
said first position being a reference point,
wherein said position of said second arm determines a position of a piece of sheet metal, and wherein said position of said third arm also determines said position of said piece of sheet metal, and
at least two stops, said stops engaging a slide bar mounted on said brake, one of said stops operably connected to said second arm and the other said stop operably connected to said third arm to facilitate movement of said piece of sheet metal.

15. An indexer as in claim 14 wherein said stop is a spring tempered stop.

16. An indexer as in claim 14 wherein said stop is a stop groove.

17. An indexer for use with a sheet bending brake, said indexer comprising:
a rotatable shaft having at least two movable bending arms pivotally attached thereto, said shaft being rotatable to cause a first arm to pivot about a first pivot point to extend or retract to a first position and a second arm to pivot about a second pivot point to extend or retract to a position corresponding thereto, said first and second arms moving in response to angular rotation of said shaft with the movement of said first arm defining a plane that is substantially orthogonal to a plane defined by the movement of said second arm,
said first position being a reference point,
wherein said position of said second arm determines a position of a piece of sheet metal.

18. An indexer for use with a sheet bending brake, said indexer comprising:
a rotatable shaft having three movable bending arms pivotally attached thereto, said shaft being rotatable to cause said a first arm to pivot about a first pivot point to extend or retract to a first position, a second arm to pivot about a second pivot point to extend or retract to a position corresponding to said first position, and a third arm to pivot about a third pivot point to extend or retract to a position corresponding to said first position, said first, second, and third arms moving in response to angular rotation of said shaft with the movement of said first arm defining a plane that is substantially orthogonal to a plane defined by the movement of said second and third arms,
said first position being a reference point,
wherein said position of said second arm determines a position of a piece of sheet metal, and
wherein said position of said third arm also determines said position of said piece of sheet metal.

19. An indexer for use with a sheet bending brake, said indexer comprising:
a rotatable shaft having at least two movable bending arms pivotally attached thereto,
said shaft being rotatable to cause a first arm to pivot about a first pivot point to extend or retract to a first position and a second arm to pivot about a second pivot point to extend or retract to a position corresponding thereto,
said first position being a reference point,
wherein said position of said second arm determines a position of a piece of sheet metal, and
an adjustable gauge pivotally connected to said first arm and capable of being positioned at said reference point.

* * * * *